United States Patent Office 3,716,382
Patented Feb. 13, 1973

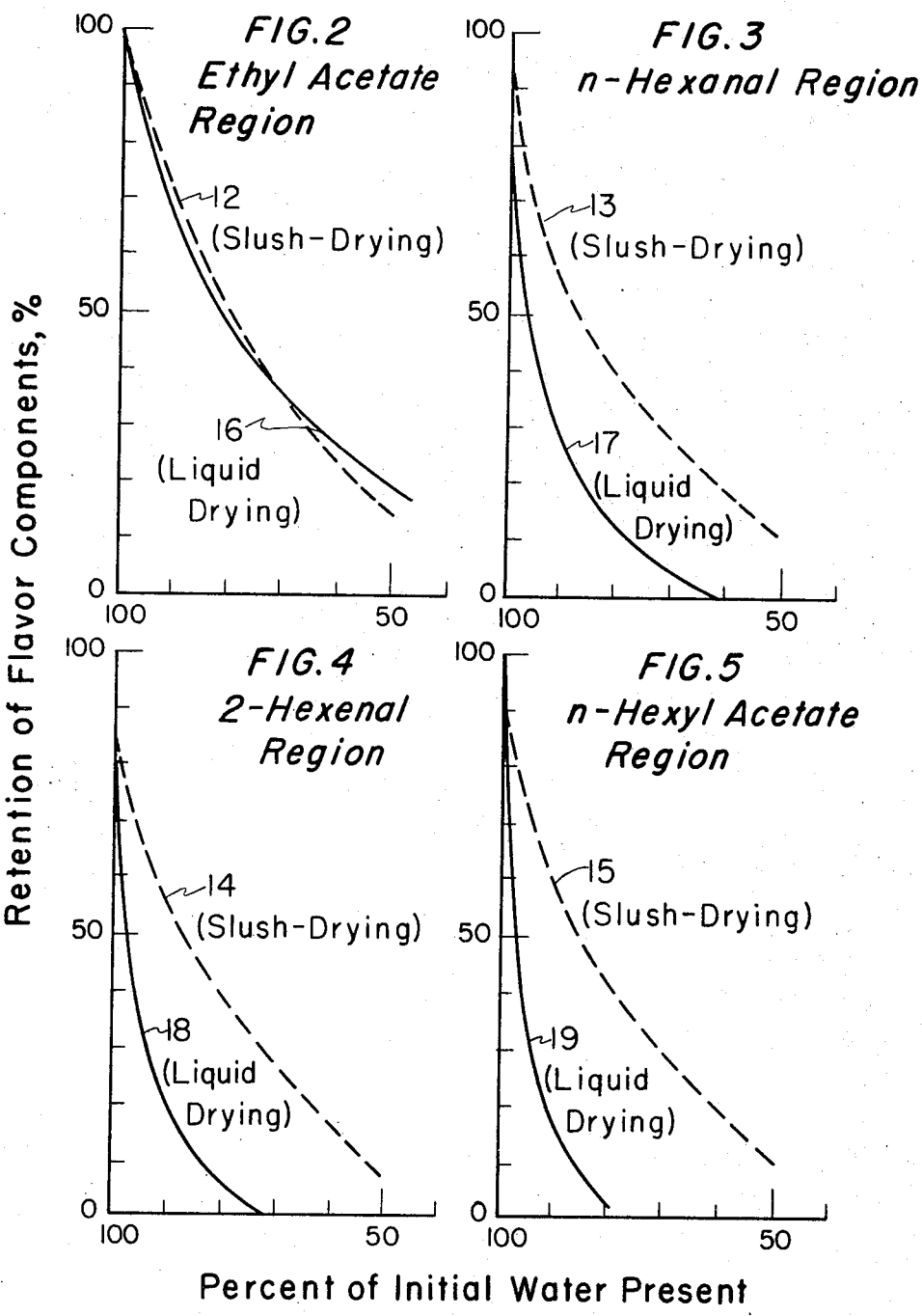

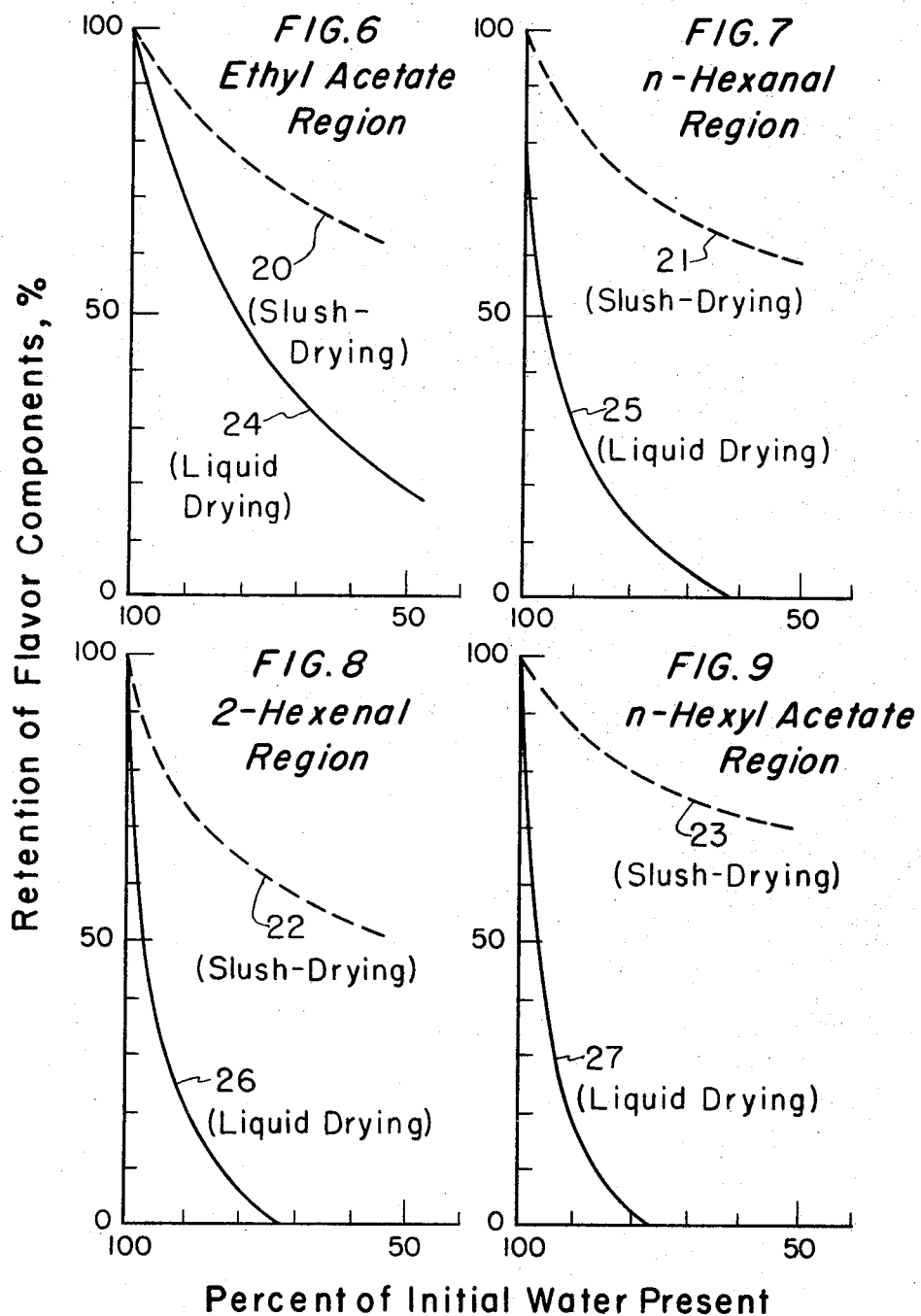

3,716,382
SLUSH-DRYING OF LIQUID FOODS
Santosh K. Chandrasekaran, Albany, and Cary Judson King III, Kensington, Calif., assignors to the United States of America as represented by the Secretary of Agriculture
Filed June 24, 1970, Ser. No. 49,410
Int. Cl. A23b 7/02
U.S. Cl. 99—205        1 Claim

ABSTRACT OF THE DISCLOSURE

Liquid foods are dehydrated by subjecting them to a vacuum and to a temperature only low enough to freeze part of the water content to produce a slush. A high drying rate, coupled with good flavor retention is provided.

---

A non-exclusive, irrevocable, royalty-free license in the invention herein described, throughout the world for all purposes of the United States Government, with the power to grant sublicenses for such purposes, is hereby granted to the Government of the United States of America.

This invention relates to and has among its objects the provision of novel processes for dehydrating liquid foods. Further objects of the invention will be evident from the following description wherein parts and percentages are by weight unless otherwise specified.

In the appended drawing:

FIGS. 2–5 are graphs comparing the retention of volatile flavor components when dehydration is applied to apple juice (initial solids content 17%) maintained in the liquid state (solid lines in the graphs) and in the form of a slush (dotted lines in the graphs). The legends "Retention of Flavor Components, %" and "Percent of Initial Water Present" are applicable to all four of the figures.

Figure 1:
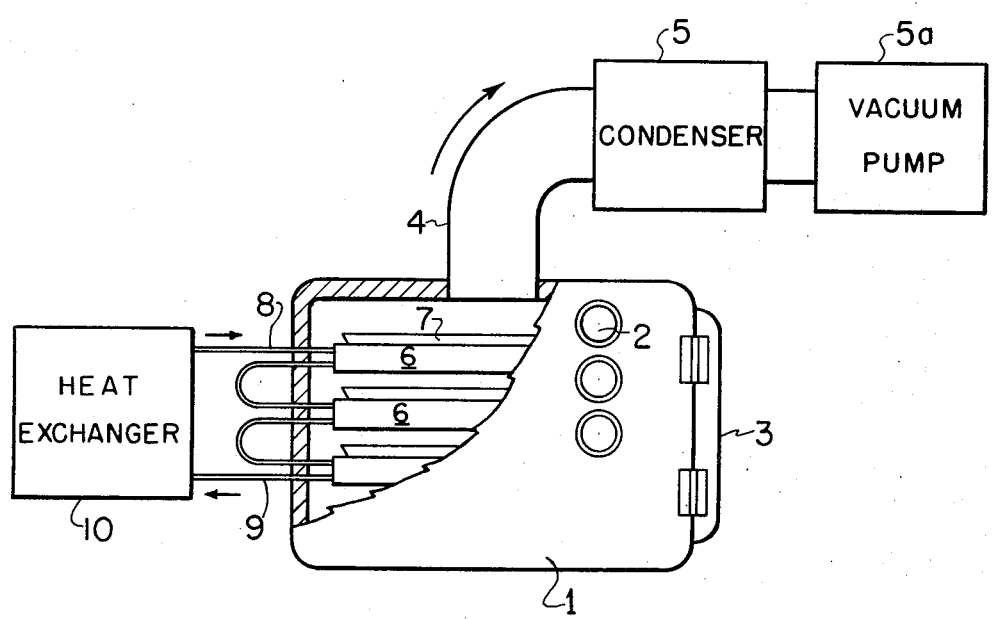
FIG. 1 is a schematic diagram illustrating apparatus which may be employed in a practice of the invention.

FIGS. 6–9 are graphs comparing the retention of volatile flavor components when dehydration is applied to apple juice (previously concentrated to 44% solids content) maintained in the liquid state (solid lines in the graphs) and in the form of a slush (dotted lines in the graphs). As in the case of FIGS. 2–5, the legends at the side and base of the block of figures are applicable to each of FIGS. 6–9.

In the following description, emphasis is directed to the treatment of fruit juices. This is by way of example, not limitation. Similar problems are encountered with other products, and in its broad ambit the invention is applicable to liquid foods in general.

In preparing dehydrated products such as concentrates from fruit juices, the usual practice is to maintain the juice in the liquid state during the treatment. Thereby, the removal of water involves evaporation, that is, conversion of liquid water to water vapor. This technique has the advantage that it affords a high drying rate. However, it has the disadvantage that volatile flavoring principles are evaporated with the water and lost (unless an elaborate and expensive essence recovery system is provided). In efforts to reduce the loss of volatile flavoring principles, it has been advocated that fruit juices be freeze-dried. In such processes the juice is frozen and then while maintained in the frozen state (in the form of thin sheets, flakes, granules, or the like) is subjected to vacuum, whereby the removal of water involves sublimation, that is, conversion of solid water (ice) into water vapor. The freeze-drying of fruit juices has indeed proven to have the advantage that a greater proportion of volatile flavoring principles are retained in the product. However, freeze-drying has the disadvantage that the rate of dehydration is low. As a result, freeze-drying is much more costly than drying from the liquid state.

A particular object of the invention is the provision of processes which provide a high drying rate coupled with good retention of volatile flavoring principles. Basically, the invention utilizes a principle which may be termed "slush-drying" because the liquid food is maintained in the form of a slush—a mixture of ice and liquid—during the dehydration.

In a practice of the invention one may use various types of apparatus, for example, conventional freeze-drying equipment, with proviso that means be provided so that the temperature of the material under dehydration can be so controlled that it is maintained in the form of a slush. The practice of the invention using such equipment is described below in connection with FIG. 1 in the appended drawing.

The apparatus shown in FIG. 1 includes chamber 1 provided with glass ports 2 and vacuum-tight door 3. For maintaining the interior of chamber 1 under vacuum there is provided conduit 4 communicating with condenser 5 and vacuum pump 5a. During operation of the device, the interior of chamber 1 is held at a pressure of about 50 mm. Hg or less. Condenser 5 is continuously refrigerated so that the water vapor leaving chamber 1 via conduit 4 is continuously removed from the system as frost or ice.

Within chamber 1 are a series of shelves 6 of hollow construction so that a heat transfer medium can be circulated through them.

The material being dehydrated is contained in trays 7 which rest on shelves 6.

For circulating the heat transfer medium there are provided pipes 8 and 9 communicating with the interior of hollow shelves 6. Pipes 8 and 9, in turn, are in communication with adjustable heat exchanger 10. With this system the medium is heated to the extent necessary to continuously supply the heat of evaporation and sublimation while maintaining the material in trays 7 in the form of a slush.

The temperature required to maintain the material as a slush cannot be stated in terms of so many degrees because it will vary depending primarily on the solids content of the material under dehydration, and this in turn will change as the dehydration progresses. In any particular case the proper temperature to apply can be determined by pilot trials on samples of the material, or by observing the material during the course of the dehydration (for example, through windows 2 in the apparatus of FIG. 1) and adjusting heat exchanger 10 to control the temperature of the material as is necessary. In general, the material under dehydration is kept at such a temperature that about 20 to 70% of the water present in the material is frozen (ice), the remainder is liquid. This liquid remainder will not be pure water but rather an aqueous solution containing the sugars and other water-soluble components of the material under treatment. It is obvious that since both ice and liquid water are present in the material under treatment, the removal of water takes place by concurrent sublimation and evaporation.

The dehydration procedure as described above is continued for the time necessary to attain the desired degree of dehydration of the starting material. If a concentrate of relatively high solids content is desired as the end product, the dehydration is continued long enough to achieve a high degree of dehydration. Conversely, if a product of relatively low solids content is desired, the treatment is continued only for the time necessary to attain a lesser degree of dehydration. By way of example but not limitation, when fruit juices are subjected to the process of the invention they may be dehydrated to a level of about 40 to 60% solids to yield products to be preserved by freezing, canning, or other conventional treatment, or they may be dehydrated to higher levels of solids content, say 75 to 85%, to attain self-preserving concentrates. Moreover, the materials may be dehydrated to essentially complete dryness, i.e., 90% or greater solids content. It is evident from the above that the degree of dehydration is not a critical factor but simply depends on the type of product desired by the operator.

It is to be understood that the apparatus of FIG. 1 is provided by way of illustration and not limitation. It is obvious that one can carry out the process of the invention in other forms of equipment which are furnished with means for exposing the material to vacuum, a heat supply source, a mechanism for water vapor removal, and means for controlling the temperature of the material during the treatment. For operation on a continuous basis, the material can be transported through the vacuum dehydrator while supported on an endless belt or other conveyor. Systems may be used wherein the slush is sprayed or cascaded through a chamber provided with the appropriate vacuum-producing and temperature-controlling means.

The invention is of wide applicability and can be used for the concentration of liquid foods of all kinds. Typical liquids to which the invention may be applied are listed below solely by way of example and not limitation:

Fruit and vegetable products: Juices, extracts, pulps, purees, and similar liquid products derived from fruits or vegetables such as orange, grapefruit, lemon, lime, apple, pear, apricot, strawberry, raspberry, cranberry, pineapple, grape, prune, plum, peach, cherry, tomato, celery, carrot, spinach, onion, lettuce, cabbage, potato, sweetpotato, watercress, etc. The liquid products may be prepared in customary manner by subjecting edible portions of the produce to such operations as reaming, pressing, macerating, crushing, comminuting, extracting with water, cooking, steaming, etc. These operations may be applied to the fresh produce or to processed produce, that is, produce which has been subjected to such operations as cooking, blanching, freezing, canning, sundrying, sulphiting, or preservation by application of chemical preservatives or ionizing radiations.

Meat and fish products: Meat extracts, meat juices, soups or broths made from meat or fish products with or without added vegetative material, clam juice, oyster stew, fish or clam chowders, etc.

Lacteal products: Whole milk, skim milk, whey, cream, buttermilk, yogurt, milk products containing such additives as chocolate, cocoa, sugar, malt, vitamins, sugar, etc.

Cereal products: Aqueous extracts of cereals such as wheat, barley, malted barley, rice, corn, etc.

Beverages: Aqueous extracts of coffee, tea, chocolate, yerba mate, roasted cereal products (simulated coffee products), etc.

Carbohydrate substances: Honey, maple syrup, corn syrup, sorghum syrup, molasses, etc.

Egg products: Egg white, egg yolk, whole egg, or preparations of egg with other foods such milk, cream, sugar, flavorings, etc.

Miscellaneous: Juices, extracts, purees and other liquid products made from alfalfa, clover, grasses, cottonseed or soybean meals, sugar cane, sugar beet, sorghum, animal blood, etc. Vitamin preparations such as solutions of ascorbic acid, thiamin or other vitamins, vitamin concentrates or precursors, fermentation products such as beers (culture liquors) containing mushroom mycelium, yeasts, biosynthesized vitamins, etc.

EXAMPLES

The invention is further demonstrated by the following illustrative examples.

Example 1

(A) Slush-drying: Samples of apple juice (17% solids content) were dehydrated in a vacuum dehydrator maintained at an absolute pressure of about 0.5 mm. Hg. During the dehydration, the juice was maintained in the form of a slush—a mixture of ice crystals and liquid. The initial juice and the products were analyzed by vapor phase chromatography to determine their content of volatile flavor components. To cover the wide boiling point range of the flavor components naturally present in apple juice, measurements were made in four areas as follows:

Ethyl acetate region: Including methanol, ethanol, ethyl acetate, isobutanol, and acetal.

n-Hexanal region: Including n-hexanal and n-butyl acetate.

2-hexenal region: Including ethyl 2-methylbutyrate, 2-hexenal, and n-hexanol.

n-Hexyl acetate region: Comprising essentially n-hexyl acetate.

(B) Liquid pool drying: In this case the samples of apple juices were retained in the liquid state (55–60° C.) during the dehydration which was carried out at atmospheric pressure. Chromatographic analyses were made of the products.

The results of parts A and B are shown in FIGS. 2–5 which are graphs of the percent of initial water in the material under treatment versus the percent retention of flavor components. In these graphs the dotted lines (curves 12, 13, 14, 15) represent the slush-drying treatment; the solid lines (curves 16, 17, 18, 19) represent drying from the liquid state. It is evident from FIGS. 3, 4, and 5 that the slush-drying procedure yielded an improved retention of flavor components in three of the important flavor areas, namely, the n-hexanal, 2-hexenal, and n-hexyl acetate regions.

Example 2

The procedures as described in Example 1 were repeated except that in this case the starting material was apple juice which had been previously concentrated to 44% solids.

The results are shown in FIGS. 6, 7, 8, and 9 wherein the dotted lines (curves 20, 21, 22, 23) represent the slush-drying procedure, whereas the solid lines (curves 24, 25, 26, 27) represent drying from the liquid state.

It is interesting to note that in the case of drying from the liquid state (curves 24, 25, 26, 27) the retention of flavor components is substantially identical as when this procedure is applied to juice of 17% solids content (curves 16, 17, 18, 19 in FIGS. 2–5). However, the slush-drying procedure, as shown by curves 20, 21, 22, and 23, yields an improved retention of flavor components in all four of the flavor areas.

Having thus described the invention, what is claimed is:

1. A method for dehydrating a fruit juice which comprises subjecting the juice to a vacuum while maintaining it at a temperature low enough to freeze 20 to 70% of its content of water so that the juice is in the form of a slush of ice and liquid, but not so low as to freeze the juice completely so as to maintain the ratio of 20 to 70% frozen water in the slush throughout vacuum dehydration.

References Cited

UNITED STATES PATENTS

| | | | |
|---|---|---|---|
| 3,309,779 | 3/1967 | Ginn | 99—71 |
| 3,373,042 | 3/1968 | Elerath | 99—71 |
| 3,362,835 | 1/1968 | Thuse | 99—71 |
| 3,443,963 | 5/1969 | Simon | 99—199 |

NORMAN YUDKOFF, Primary Examiner

M. G. MULLEN, Assistant Examiner

U.S. Cl. X.R.

99—199, 210, 206, 192, 204, 200, 208, 71